May 8, 1962     F. X. CONNOLLY     3,033,222
PORTABLE URINE COLLECTING DEVICE WITH OVERFLOW HANDLE
Filed July 31, 1958
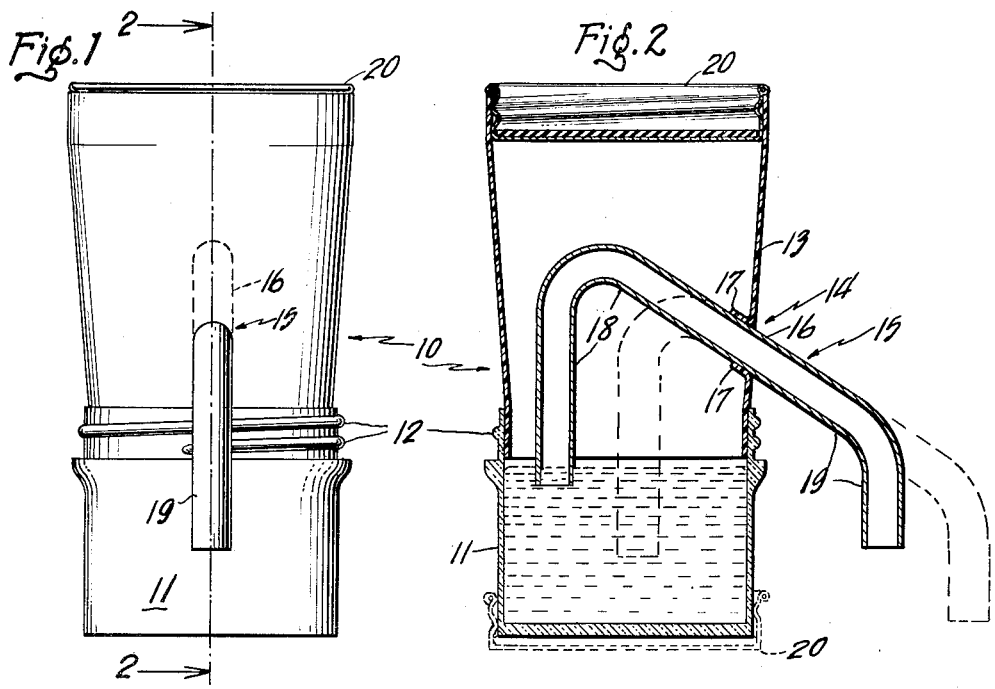
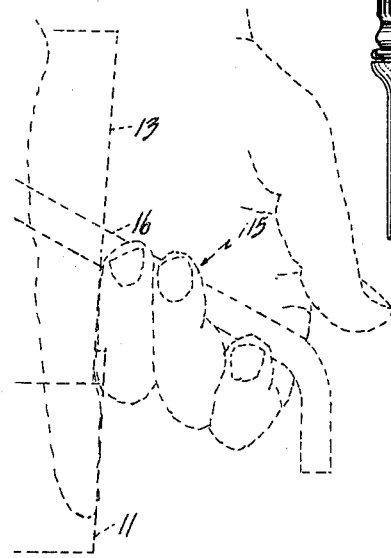
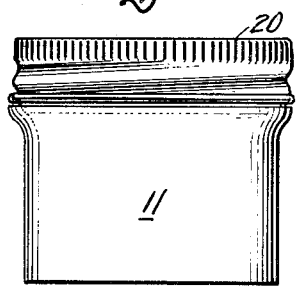
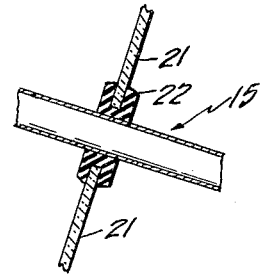
Inventor
Frank X. Connolly
by Andrus and Smith
His Attorneys

United States Patent Office 3,033,222
Patented May 8, 1962

1

3,033,222
PORTABLE URINE COLLECTING DEVICE WITH
OVERFLOW HANDLE
Frank X. Connolly, 714 3rd Ave., Troy, N.Y.
Filed July 31, 1958, Ser. No. 752,211
6 Claims. (Cl. 137—152)

This invention has to do with a device for collecting small predetermined amounts of liquid, such as urine specimens, having particular reference to a receptacle into which urination directly takes place while the same is being held by a tubular handle through which the excess urine flows into a waste space, such as a urinal, while the user is in a standing or sitting position, and the provision of such a device is the principal object of the invention.

Physicians constantly require stated amounts of urine specimens of patients for analysis without too much concern as to how it is obtained. However, it has long been felt in the medical profession that it would be a distinct improvement if a device whereby a direct, convenient and sanitary means of collecting such a desired amount of urine specimen could be made available, especially in which such specimen could be obtained and delivered in uncontaminated condition, and such a device has now been provided by means of the present invention.

A general object of the invention is, therefore, also to provide such a device, and one that is economical of manufacture, simple to use, that meets all of expressed requirements and is otherwise well suited to the purposes for which it is intended.

More specifically, it is an object of the invention to provide such a device preferably comprising a flat bottom receptacle, and a siphon therefor, which also preferably is adjustable and in the form of a handle; an intermediate portion of the siphon extending through a sidewall section of the receptacle and in sealed engagement therewith, a first portion of the siphon extending inwardly and downwardly of the receptacle and terminating a distance above the bottom thereof in order to determine the height of the urine level and consequent amount of specimen to be collected, and a second portion of the siphon extending outwardly and downwardly from the intermediate portion and terminating in a plane between the bottom of the receptacle and the end of the first portion, the siphon preferably being slidably adjustable selectively to control the height of the column of urine to be collected.

More specifically, it is also an object of the invention to provide a urine specimen collecting container assembly including a container member for the specimen to be collected, an extension sleeve removably fitted within the top of the container member, a handle fitted within the side of the sleeve comprising a siphon extending inwardly of the sleeve and downwardly into the container a selected distance to determine the desired quantity of urine to be collected therein; the assembly preferably including a cover member removably carried thereby and adapted to fit the top of the container member to seal the contents thereof.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

FIG. 1 is an elevational view illustrating an embodiment of the invention;

FIG. 2 is a vertical sectional view taken along the lines 2—2 of FIG. 1 and looking in the direction of the arrows;

FIG. 3 is an elevational view of a container with a cover sealing the specimen contents therein;

FIG. 4 is a dotted line illustration depicting a convenient manner of holding the device during use; and FIG. 5 is a sectional detail of a modified form of construction embodied in such a device.

Referring more particularly to the drawing, there is indicated generally at 10 a urine specimen collecting container assembly. A container member 11 which preferably is of a transparent material, such a glass, is provided with an externally threaded neck portion 12. A sleeve member 13 is connected to the open top of the container member 11 and preferably is made of any suitable resilient material, such, for example, as plastic that is either transparent, translucent or colored, although it will be understood that any other type of material may be used including waterproof paper material or a non-resilient but rigid type of material whether made of glass or metal providing the same is suitably attachable to the container member 11 for the purpose intended. It will also be understood that, regardless of the type of material used, the sleeve and container member can be made in one piece as a collecting vessel or receptacle. However, the type of construction shown in the drawing in the form of a separable member and sleeve is preferable.

One side of the sleeve is penetrated or perforated as indicated generally at 14 in a manner such that it will receive a handle member in the form of a bent tube or siphon, indicated generally at 15. This siphon or handle member has an intermediate portion 16 that extends through the perforated side wall of the sleeve 13 in a manner such that the side wall material 17 encircling the perforation, frictionally and sealingly embraces the handle member 15. One portion of the siphon member extends inwardly and downwardly of the sleeve or receptacle, as at 18, and terminates a distance above the bottom thereof that will determine the height of urine level and consequent amount of specimen to be collected. A second portion of the siphon extends outwardly and downwardly as at 19 and terminates at a point lying in a plane between the bottom of the receptacle and the end of the first portion.

Preferably the intermediate portion of the siphon is angularly disposed and slidably adjustable selectively to control the height of the column of urine to be collected in the container member as shown in the dotted line position and the first and second portion of the syphon that extend downwardly from the intermediate portion are substantially parallel. A cover member 20, having threads that conform to those of the container member indicated at 12, may be placed in inverted position in the top of the sleeve 13 to close the same before use. When it is desired to use the same the cover 20 is removed and may be placed in any convenient out-of-the-way position, even on the bottom of the container member as is indicated in dotted lines in FIG. 2.

In using the device after removal of the cover, the same may be held as illustrated in FIG. 4 whether the user is in a standing or sitting position with respect to a depositing space such as a convenient urinal. The urine will flow into the receptacle and will rise until it flows through the handle after which, when the flow of urine into the receptacle ceases, the flow through the handle will continue until the volume of liquid collected, that is, the amount remaining in the receptacle, is approximately equal to the volume of the receptacle between the botom end of the siphon handle within the receptacle. The sleeve 13 which merely frictionally engages the inner neck of the container 11 may now conveniently be removed and the cover 20 placed thereon to seal the contents therein for delivery to the physician for analysis.

In FIG. 5 there is merely illustrated a side wall of a receptacle that is made of a rigid material such as glass or metal as at 21 in which a hole has been made to receive a resilient grommet 22 whereby the tubular siphon handle 15 is received through the grommet in a frictional manner in order to make it liquid-tight as well as to permit sliding the tube in or out with respect to the receptacle to make it adjustable when it is desired to pre-determine the amount of liquid it is desired to collect.

Such a urine collecting device has many advantages. For example, it makes possible the collection of a volume of specimen relatively small in comparison to the total potential volume of urination without first urinating into a container of sufficient volume to collect the total potential volume of urine, and the pouring off of the excess, or pouring the required amount into another container. Furthermore, there is no necessity for interrupting urination in order to avoid overflowing the container when the volume of the latter is smaller than the total potential volume of urine. Also, there is eliminated the necessity of passing the container through the flow of urine when the container volume is smaller than the total volume, or any need for attempting to urinate only the required amount desired.

It will thus be seen that the objects hereinbefore set forth may readily and efficiently be obtained and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A urine specimen collecting device including in combination a portable container, an opening formed in the wall of said container, an overflow tube forming a handle to position the device, a central portion of said overflow tube slidably disposed in said opening, said central portion having a diameter slightly less than the diameter of said opening, an external end of said tube disposed outside of said container, an internal end of said tube within said container and joined to said external end by said central portion, said central portion being straight and of constant diameter and inclined downwardly externally with said external end lower than said internal end, and said internal end being directed downwardly whereby axial movement of said central portion can alter the vertical distance of said internal end from the bottom of said container.

2. A urine specimen collecting device including in combination a portable container of circular cross-section and open at the top thereof to be fuly exposed to atmospheric pressure, an opening formed in the wall of said container, an overflow tube forming a handle to position the device, a central portion of said overflow tube slidably disposed in said opening, an external end of said tube disposed outside of said container, an internal end of said tube within said container and joined to said external end by said central portion, said internal end having a cross-sectional diameter substantially less than the cross-sectional diameter of said container and said central portion being greater in length than the diameter of the cross-section of said container, and said internal end being directed downwardly whereby axial movement of said central portion can alter the vertical distance of said internal end from the bottom of said container.

3. A urine specimen collecting device in accordance with claim 2 in which the internal and external ends of the tube are parallel and the external end of the tube is disposed in all positions beneath the internal end of said tube.

4. A urine specimen collecting device in accordance with claim 3 in which the lowermost portion of the internal end and the lowermost portion of the external end proscribe horizontal parallel planes.

5. A portable container including in combination a circular cross-sectioned hollow member closed at the bottom and opened at the top, an opening in the side of said member, a handle, a central section of said handle disposed in said opening, an end section of said handle within said hollow member, a second end section of said handle without said hollow member, said handle having a central bore therethrough forming a siphon, resilient means encircling the portion of said handle disposed in said opening and making said opening with said handle disposed therein watertight, and said handle being shiftable within said opening whereby shifting thereof can result in a greater or lesser portion of said handle projecting from said member.

6. A portable container in accordance with claim 5 in which said first end section of the handle projects downwardly so that it is capable of being positioned axially of the member.

References Cited in the file of this patent

UNITED STATES PATENTS

| | | |
|---|---|---|
| 442,696 | Thompson | Dec. 16, 1890 |
| 703,131 | Jaenel | June 24, 1902 |
| 1,810,822 | Erickson | June 16, 1931 |
| 2,225,472 | Franklin | Dec. 17, 1940 |

FOREIGN PATENTS

| | | |
|---|---|---|
| 32,498 | Germany | July 28, 1885 |
| 9,414 | Great Britain | Apr. 13, 1897 |
| 832,220 | France | Sept. 23, 1938 |
| 1,042,707 | France | Nov. 3, 1953 |